(12) United States Patent
Herron et al.

(10) Patent No.: US 10,706,645 B1
(45) Date of Patent: Jul. 7, 2020

(54) REMOTE DIAGNOSTIC SYSTEM AND METHOD

(71) Applicant: Drew Technologies, Inc., Ann Arbor, MI (US)

(72) Inventors: Brian J. Herron, Dexter, MI (US); Thomas J. Fournier, Tucson, AZ (US); Michael L. Drew, Dexter, MI (US)

(73) Assignee: Drew Technologies, Inc., Ann Arbor, MI (US)

( * ) Notice: Subject to any disclaimer, the term of this patent is extended or adjusted under 35 U.S.C. 154(b) by 293 days.

(21) Appl. No.: 15/446,744

(22) Filed: Mar. 1, 2017

Related U.S. Application Data

(60) Provisional application No. 62/305,699, filed on Mar. 9, 2016.

(51) Int. Cl.
| | |
|---|---|
| *G07C 11/00* | (2006.01) |
| *G07C 5/08* | (2006.01) |
| *H04L 29/08* | (2006.01) |
| *G07C 5/00* | (2006.01) |
| *G06F 8/65* | (2018.01) |

(52) U.S. Cl.
CPC ............ *G07C 5/0808* (2013.01); *G06F 8/65* (2013.01); *G07C 5/008* (2013.01); *G07C 5/0825* (2013.01); *H04L 67/12* (2013.01); *H04L 67/26* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 5,491,418 A | 2/1996 | Alfaro et al. | |
| 6,122,575 A * | 9/2000 | Schmidt | G06F 11/2252 244/1 R |
| 6,154,658 A | 11/2000 | Caci | |
| 6,728,603 B2 * | 4/2004 | Pruzan | H04L 12/4604 340/531 |

(Continued)

OTHER PUBLICATIONS

Commonly assigned co-pending U.S. Appl. No. 15/651,351, filed Jul. 17, 2017, entitled Vehicle Diagnostic and Programming Device and Method.

(Continued)

*Primary Examiner* — Jonathan M Dager
(74) *Attorney, Agent, or Firm* — Gardner, Linn, Burkhart & Ondersma LLP

(57) ABSTRACT

A vehicle diagnostic system and method of performing vehicle diagnostics includes a local system that is adapted to connect with a vehicle and a remote system that is adapted to connect with the local system via an Internet. The local system has a vehicle interface and a local computer system operatively connected with the vehicle interface. The local computer system operates a diagnostic program specific to the vehicle under test. The remote system has a remote diagnostic control program. The remote diagnostic control program interfaces with the local computer system for performing a diagnostic evaluation of a vehicle under test. The remote system controls the local system to perform the diagnostic evaluation of the vehicle under test exclusive of the local system operator.

22 Claims, 10 Drawing Sheets

(56) References Cited

U.S. PATENT DOCUMENTS

| | | | |
|---|---|---|---|
| 6,879,894 B1* | 4/2005 | Lightner | G07C 5/008 701/31.4 |
| 6,928,349 B1 | 8/2005 | Namaky et al. | |
| 6,956,501 B2* | 10/2005 | Kitson | H04Q 9/02 340/539.24 |
| 7,092,803 B2 | 8/2006 | Kapolka et al. | |
| 7,373,226 B1* | 5/2008 | Cancilla | G06Q 10/04 340/438 |
| 7,502,672 B1* | 3/2009 | Kolls | G06Q 30/02 340/988 |
| 7,519,458 B2* | 4/2009 | Buckley | G01M 17/00 701/2 |
| 7,532,962 B1* | 5/2009 | Lowrey | G01M 15/04 340/438 |
| 7,584,030 B1* | 9/2009 | Graham | H01R 13/665 701/33.2 |
| 7,786,851 B2 | 8/2010 | Drew et al. | |
| 7,840,812 B1* | 11/2010 | Levenberg | H04L 63/0823 713/150 |
| 7,928,837 B2 | 4/2011 | Drew et al. | |
| 8,190,322 B2 | 5/2012 | Lin et al. | |
| 8,258,936 B2* | 9/2012 | Mahalingaiah | G06Q 50/30 340/438 |
| 8,306,687 B2* | 11/2012 | Chen | G06Q 10/20 235/380 |
| 8,339,254 B2 | 12/2012 | Drew et al. | |
| 8,352,577 B2* | 1/2013 | Martone | G06F 8/60 701/2 |
| D675,568 S | 2/2013 | Drew et al. | |
| 8,514,825 B1* | 8/2013 | Addepalli | H04W 4/046 370/338 |
| 8,589,020 B1* | 11/2013 | Angus | G06F 11/3006 701/29.1 |
| 8,638,207 B2 | 1/2014 | Drew et al. | |
| 8,640,228 B2* | 1/2014 | Croize | G06F 21/34 726/20 |
| D701,832 S | 4/2014 | Drew et al. | |
| 8,688,313 B2* | 4/2014 | Margol | G06F 8/61 701/31.4 |
| 8,825,276 B2* | 9/2014 | Lake | G07C 5/0808 701/31.6 |
| 8,848,608 B1* | 9/2014 | Addepalli | H04W 72/0406 370/328 |
| D718,201 S | 11/2014 | Drew et al. | |
| 8,909,416 B2* | 12/2014 | Chen | G06F 17/00 701/33.3 |
| D725,519 S | 3/2015 | Drew et al. | |
| 8,977,423 B2* | 3/2015 | Merg | G07C 5/008 701/31.4 |
| 8,989,958 B2* | 3/2015 | Ric | H04L 63/0245 701/31.4 |
| 9,002,554 B2* | 4/2015 | Chen | G07C 5/008 340/901 |
| 9,141,830 B2* | 9/2015 | Uczekaj | H04L 67/12 |
| 9,266,626 B2* | 2/2016 | Cheriere | G06F 11/008 |
| 9,407,635 B2* | 8/2016 | Angus | H04L 63/0428 |
| 9,475,590 B2* | 10/2016 | Buehler | G07C 5/0808 |
| 9,507,982 B2* | 11/2016 | Mylaraswamy | H04W 4/80 |
| 9,530,255 B2* | 12/2016 | Drew | G07C 5/008 |
| 9,563,988 B2 | 2/2017 | Drew et al. | |
| 9,637,244 B2* | 5/2017 | Wischmeyer | B64D 45/00 |
| 9,857,430 B2* | 1/2018 | Kallfelz | H04Q 9/00 |
| 10,013,816 B2 | 7/2018 | Nassar et al. | |
| 10,109,119 B2* | 10/2018 | Keane | G07C 5/008 |
| 10,181,225 B2* | 1/2019 | Liebl | G07C 5/008 |
| 10,282,924 B2 | 5/2019 | Drew et al. | |
| 2003/0001720 A1 | 1/2003 | Wade et al. | |
| 2003/0020759 A1* | 1/2003 | Cancilla | G01D 1/00 715/810 |
| 2004/0044454 A1 | 3/2004 | Ross et al. | |
| 2004/0106404 A1* | 6/2004 | Gould | B64D 47/00 455/431 |
| 2004/0167689 A1 | 8/2004 | Bromley et al. | |
| 2005/0021294 A1 | 1/2005 | Trsar et al. | |
| 2005/0038581 A1* | 2/2005 | Kapolka | G06Q 10/08 701/31.4 |
| 2005/0060070 A1 | 3/2005 | Kapolka et al. | |
| 2005/0171661 A1* | 8/2005 | Abdel-Malek | B61L 27/0094 701/31.4 |
| 2005/0182537 A1 | 8/2005 | Tefft et al. | |
| 2005/0240555 A1* | 10/2005 | Wilde | G06F 17/2247 |
| 2005/0251304 A1 | 11/2005 | Cancellara et al. | |
| 2006/0052921 A1 | 3/2006 | Bodin et al. | |
| 2006/0106508 A1* | 5/2006 | Liebl | G07C 5/008 701/31.4 |
| 2006/0202862 A1 | 9/2006 | Ratnakar | |
| 2006/0211446 A1 | 9/2006 | Wittmann et al. | |
| 2006/0217855 A1 | 9/2006 | Chinnadurai et al. | |
| 2007/0005201 A1* | 1/2007 | Chenn | G07C 5/008 701/31.5 |
| 2007/0010923 A1* | 1/2007 | Rouyre | G05B 23/0267 701/31.4 |
| 2007/0043488 A1 | 2/2007 | Avery et al. | |
| 2007/0050105 A1* | 3/2007 | Chinnadurai | G07C 5/008 701/31.4 |
| 2007/0055420 A1 | 3/2007 | Krzystofczyk et al. | |
| 2007/0073460 A1 | 3/2007 | Bertosa et al. | |
| 2007/0112576 A1* | 5/2007 | Avery | G06Q 10/10 705/7.39 |
| 2007/0185624 A1* | 8/2007 | Duddles | G06F 8/654 701/1 |
| 2007/0233340 A1 | 10/2007 | Raichle et al. | |
| 2008/0177438 A1* | 7/2008 | Chen | G07C 5/008 701/31.4 |
| 2008/0269975 A1 | 10/2008 | Bertosa et al. | |
| 2008/0280602 A1 | 11/2008 | Ban | |
| 2009/0062978 A1 | 3/2009 | Picard | |
| 2009/0077626 A1* | 3/2009 | Leclercq | H04B 7/18506 726/1 |
| 2009/0112569 A1* | 4/2009 | Angus | H04L 67/12 703/22 |
| 2009/0119657 A1* | 5/2009 | Link, II | G06F 8/64 717/171 |
| 2009/0138874 A1* | 5/2009 | Beck | G06F 8/61 717/173 |
| 2009/0187976 A1* | 7/2009 | Perroud | H04B 7/18506 726/4 |
| 2009/0192659 A1* | 7/2009 | Beebe | G06F 11/0739 701/2 |
| 2009/0259358 A1* | 10/2009 | Andreasen | G07C 5/0808 701/31.4 |
| 2009/0265055 A1* | 10/2009 | Gillies | G07C 5/008 701/31.4 |
| 2009/0276115 A1* | 11/2009 | Chen | G07C 5/008 701/29.6 |
| 2009/0326757 A1* | 12/2009 | Andreasen | G07C 5/008 701/29.6 |
| 2010/0174446 A1* | 7/2010 | Andreasen | G07C 5/008 701/31.4 |
| 2010/0262335 A1* | 10/2010 | Brozovich | G07C 5/008 701/31.4 |
| 2011/0071709 A1* | 3/2011 | Damiani | G06F 8/30 701/3 |
| 2011/0153150 A1 | 6/2011 | Drew et al. | |
| 2011/0276218 A1* | 11/2011 | Dwan | G07C 5/008 701/29.5 |
| 2011/0313593 A1* | 12/2011 | Cohen | G01S 5/0027 701/2 |
| 2012/0046826 A1 | 2/2012 | Panko | |
| 2012/0182935 A1* | 7/2012 | Addepalli | H04W 36/026 370/328 |
| 2012/0215491 A1* | 8/2012 | Theriot | G07C 5/0808 702/183 |
| 2012/0254345 A1* | 10/2012 | Montoya | G06F 11/2294 709/217 |
| 2013/0159466 A1* | 6/2013 | Mao | H04L 67/12 709/218 |
| 2013/0305391 A1* | 11/2013 | Haukom | G06F 21/84 726/29 |
| 2014/0086242 A1 | 3/2014 | Drew et al. | |

(56) References Cited

U.S. PATENT DOCUMENTS

| | | | |
|---|---|---|---|
| 2014/0121894 A1 | 5/2014 | Drew et al. | |
| 2014/0121937 A1 | 5/2014 | Drew et al. | |
| 2014/0172230 A1* | 6/2014 | Drew | G07C 5/08 |
| | | | 701/31.5 |
| 2014/0297099 A1* | 10/2014 | Drew | G07C 5/0808 |
| | | | 701/31.4 |
| 2014/0309905 A1* | 10/2014 | Drew | F02D 29/02 |
| | | | 701/101 |
| 2015/0161618 A1* | 6/2015 | Angus | G06Q 30/018 |
| | | | 705/317 |
| 2016/0070559 A1* | 3/2016 | West | G06F 8/65 |
| | | | 717/172 |
| 2016/0071331 A1* | 3/2016 | Angus | G07C 5/0808 |
| | | | 701/29.1 |
| 2016/0110937 A1* | 4/2016 | Berglund | G07C 5/0883 |
| | | | 701/29.1 |
| 2016/0300402 A1* | 10/2016 | Nassar | G07C 5/0808 |
| 2016/0364224 A1* | 12/2016 | Tuukkanen | G06F 8/65 |
| 2017/0024942 A1* | 1/2017 | Drew | G07C 5/0808 |
| 2017/0172397 A1 | 6/2017 | Zardini | |
| 2017/0186248 A1* | 6/2017 | Fournier | G01S 19/14 |
| 2017/0242680 A1* | 8/2017 | Angus | B60R 16/023 |

OTHER PUBLICATIONS

Commonly assigned co-pending U.S. Appl. No. 15/485,531, filed Apr. 12, 2017, entitled Vehicle Programming and Diagnostic Device With Integrated Battery Charger.

Commonly assigned co-pending U.S. Appl. No. 15/485,643, filed Apr. 12, 2017, entitled Battery Charger With Projecting Members.

Commonly assigned co-pending U.S. Appl. No. 29/600,447, filed Apr. 12, 2017, entitled Vehicle Diagnostic Device.

Article entitled "Remote Vehicle Diagnostic System Using Mobile Handsets" by Doo-Hee Jung, Gu-Min Jeong, and Hyun-Sik Ahn, understood to be from the proceedings of the Jun. 2006 International Conference on Wireless Networks, ICWN 2006, Las Vegas, Nevada.

Thesis entitled "Remote Connection of Diagnostic Tool" by Irina-Elena Apetri and Ali Raza, Chalmers University of Technology, dated 2011.

U.S. Appl. No. 13/245,641, as filed on Sep. 26, 2011, entitled Remote Diagnostic System for Vehicles, inventors Robert U. Beckmann, Michael Kirlauski and Andrew Woodard.

U.S. Appl. No. 15/353,809, as filed on Nov. 17, 2016, entitled Device and Method to Measure and Ensure Compliance With Vehicle Recalls or Mandatory Service Updates, claiming priority to Dec. 1, 2015, inventors Thomas Fournier, Lothar Geilen and Brian Herron.

* cited by examiner

REMOTE DIAGNOSTIC SYSTEM AND METHOD

CROSS REFERENCE TO RELATED APPLICATION

The present application claims priority of U.S. provisional application Ser. No. 62/305,699 filed Mar. 9, 2016, which is hereby incorporated herein by reference in its entirety

BACKGROUND OF THE INVENTION

In automotive repair garages, many of the tools used to diagnose and repair cars have transitioned to computer-based systems. Many of these diagnostic systems include an Internet-connected, off-the-shelf diagnostic computer running an operating system such as Microsoft Windows, and contain an installed and licensed diagnostic application(s) that was developed by an automotive manufacturer, such as Ford, or a diagnostic company, such as Snap-on. These systems are increasingly complex and, in many cases, a mechanic will use a different diagnostic system for each brand of vehicle they are working on. While some mechanics may be comfortable with these new diagnostic systems, others do not have the time or interest to learn how to use them. These diagnostic systems can also be very expensive, sometimes out of reach for technicians.

There are some existing solutions to this problem. A few companies offer a paid service in which they offer a remote service to help the local mechanic use their diagnostic system. These solutions are not cost effective for technicians because both require an upfront purchase of equipment. Also, existing solutions suffer from technical short comings.

SUMMARY OF THE INVENTION

The present invention provides a remote service that may be embodied in a hardware kit that may be leased or rented to the local mechanic and shipped pre-configured with special remote software, and include a service where a remote technician performs all diagnostic functions. While the invention is embodied in a system for remote vehicle diagnostics, its principles could also be applied to a system and method for remote reprogramming of a vehicle's electronic control units.

A vehicle diagnostic system and method of performing vehicle diagnostics, according to an aspect of the invention, includes a local system that is adapted to connect with a vehicle and a remote system that is adapted to connect with the local system via an Internet. The local system has a vehicle interface and a local computer system operatively connected with the vehicle interface. The local computer system operates a diagnostic program specific to the vehicle under test. The remote system has a remote diagnostic control program. The remote diagnostic control program interfaces with the local computer system for performing a diagnostic evaluation of a vehicle under test. The remote system controls the local system to perform the diagnostic evaluation of the vehicle under test exclusive of the local system operator.

The vehicle interface may have a unique identification and the local computer system may be associated with a particular vehicle interface according to the identification of that vehicle interface. The local computer system may be a portable computer that is owned by the owner of the remote system. The remote system may be capable of enabling and disabling the local computer system. The owner of the remote system provides all maintenance on the local computer and vehicle interface. The portable computer may have a built-in Internet connection.

The local computer system may have a display and the diagnostic control program may prohibit a local operator of the local system to view progress of a diagnostic evaluation being performed with the local system. The local computer system may have a display and the diagnostic control program may allow a local operator to view progress of a diagnostic evaluation being performed with the local system.

The remote diagnostic system may push updates to the local diagnostic control computer. The diagnostic program may be adapted to perform (i) check of the status of all electronic modules of the vehicle and/or (ii) an emissions certification test of the vehicle and/or (iii) programming of modules or service procedures related to reprogramming. The remote system may include a database of common faults, indications and symptoms of common vehicle failure modes for each type of vehicle and performs an analysis of data in said database for diagnosing failure conditions in a particular type of vehicle and for providing failure statistics to vehicle manufacturers and regulators.

These and other objects, advantages and features of this invention will become apparent upon review of the following specification in conjunction with the drawings.

DESCRIPTION OF THE PREFERRED EMBODIMENT

Figure 1:
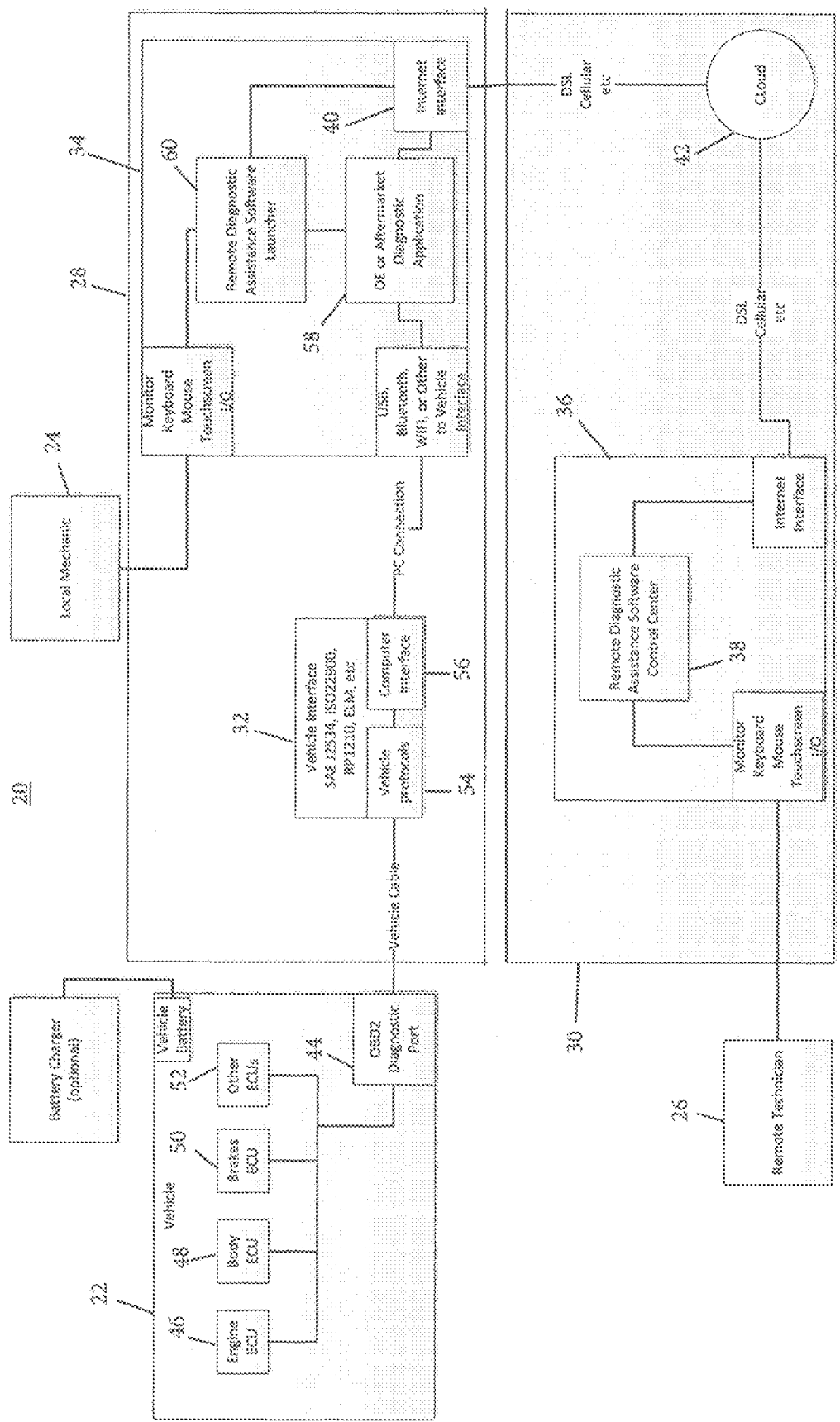
FIG. 1 is a block diagram of a remote diagnostic system, according to an embodiment of the invention.

Referring now to the drawings and the illustrative embodiment depicted therein, a vehicle diagnostic system 20 for use with a vehicle 22 is operated by a local operator, such as a mechanic 24 using a local diagnostic computer system or local system 28 and a remote technician 26 using a remote diagnostic computer system or remote system 30 (FIG. 1). Local system 28 is connected with vehicle 22 by operator 24, such as by connecting to an OBD2 diagnostic port 44 provided on late model vehicles in order to examine various vehicle electronic control units (ECU), such as the engine ECU 46, body ECU 48, brakes ECU 50, and other ECUs 52. Connection with diagnostic port 44 is via a vehicle interface tool 32, which is known in the art, and which may connect with port 44 via a cable. Interface tool 32 is a conventional device supplied according to industry standards, such as SAE, ISO, and the like. Each interface tool 32 includes a database of vehicle protocols 54 that allow intelligent communication with the ECUs of each type of vehicle on the market, as well as a computer interface 56. Computer interface 56 provides a connection with diagnostic computer 34 of local computer system 28 according to standard interfaces, such as USB, Bluetooth, WiFi, or the like. Also, computer interface 56 provides a unique identifier of the vehicle interface 32, such that each vehicle interface 32 can be distinguished from every other vehicle interface.

Local diagnostic computer 34 is operatively connected with vehicle interface 32 and includes a commercially available diagnostic application program 58 that is configured to the specific vehicle under test and a remote diagnostic assistance launcher program 60 that will be described in more detail below. Diagnostic application 58 comprises a program provided by an automotive manufacturer or a company that supplies diagnostic application programs, such as Snap-On Incorporated. In practice, computer 34 will include multiple diagnostic application programs 58 each for use with various makes and/or models of vehicles to enable local system 28 to be used with such vehicles. Alternatively, a diagnostic application program 58 may be employed for use with multiple vehicles. Local system 28 further has an Internet interface 40 to provide a communication link with remote system 30 via the Internet 42 using conventional cloud technology. In the illustrated embodiment, local diagnostic computer 34 is a portable computer having a built in Internet connection as well as a monitor and keyboard or virtual keyboard, such as a tablet device. Alternative computing devices may, however, be employed.

In the illustrated embodiment remote system 30 includes a computer 36 having a monitor, keyboard and an Internet interface 62 that allows the remote system to connect with local system 28 via Internet 42. Remote system computer 36 runs a remote diagnostic control program 38 that provides for performing a diagnostic evaluation of a vehicle under test, as will be described in more detail below. In particular, remote diagnostic control program 38 in conjunction with remote diagnostic assistance software launcher program 60 allows remote technician 26 to control local system 28 exclusive of the local system operator 24 who has no control over the local diagnostic program 58.

The vehicle diagnostic system 20 and method of performing vehicle diagnostics thus includes the local system 28 that is adapted to connect with vehicle 22, and includes remote system 30 that is adapted to connect with the local system 28 via an Internet. The local computer system 28 thus operates a diagnostic program 58 of the local system 28 specific to the vehicle 22 under test. The remote system 30 has a remote diagnostic control program 38 that interfaces with the local computer system 28 for performing a diagnostic evaluation of the vehicle 22 under test, with the remote system 30 controlling the local system 28 to perform the diagnostic evaluation exclusive of the local system operator or mechanic 24.

Figure 2:
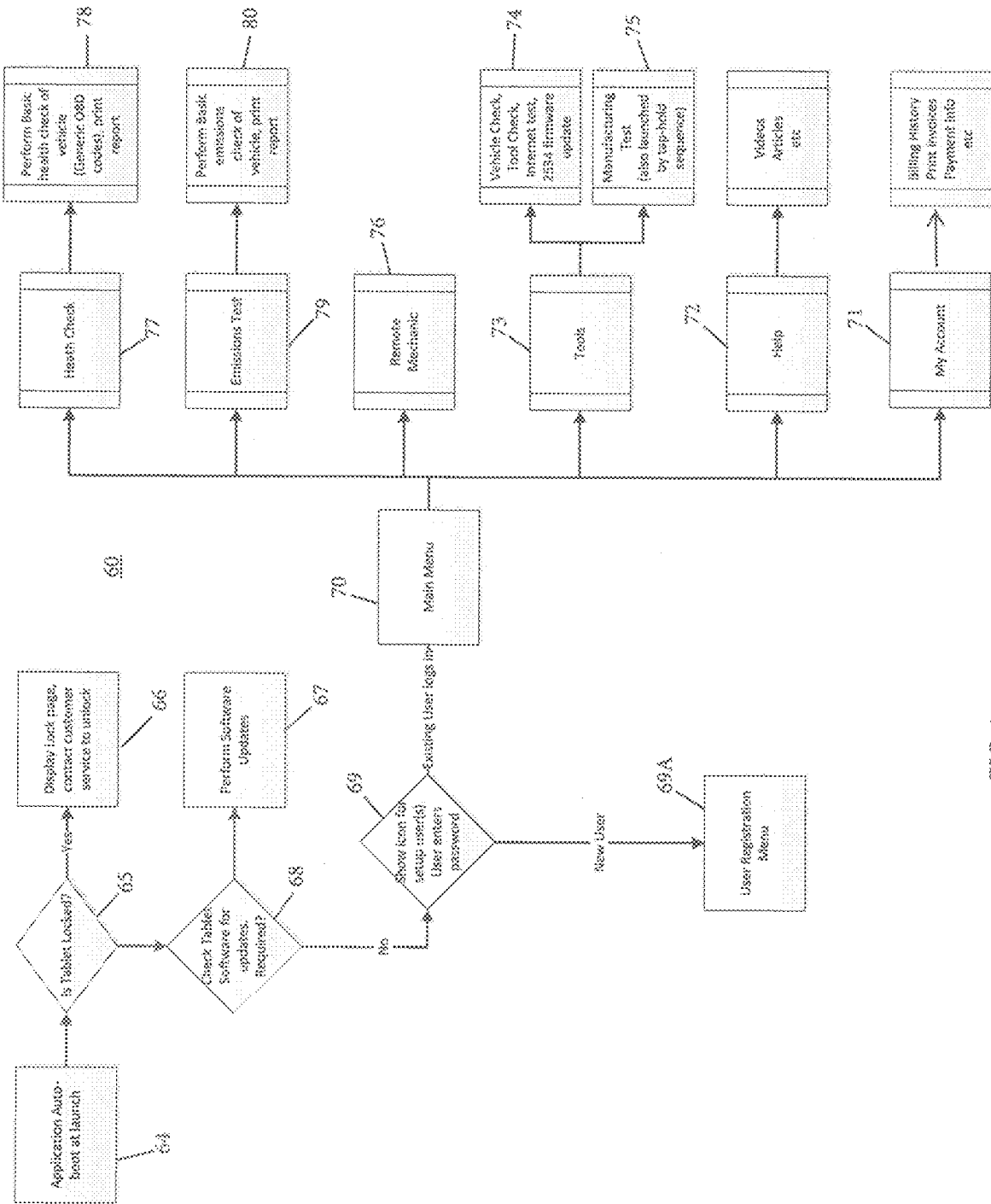
FIG. 2 is a process flow diagram of a software program provided for use by the local operator.

Remote system 30 may be made selectively available for use, such as to a local mechanic 24 at an automotive repair facility, and such as upon registration for and/or payment for the services. Referring now to FIG. 2, remote diagnostic assistance software launcher program 60 upon boot of computer 28 at 64 displays a locked page at 66, if it is determined at 65 that the remote technician locked computer 28 is due to non-payment of services due from local mechanic 24. In the illustrated embodiment, the owner of diagnostic system 20 supplies local system 28 to mechanic 24 which is rented or leased for a low cost. The local mechanic does not need to purchase a system. The mechanic can simply lease it until they are done using it. The revenue can be collected by charging per-incident fees instead of requiring an upfront tool purchase or high lease payment. If the local mechanic 24 fails to make the required lease payment, the local computer 34 is locked by remote technician 65, or at least the use of or access to remote computer 36 is locked. In a similar fashion, the remote technician 26 is in control of upgrades to computer 28 and can perform software updates at 67, if needed, as determined at 68.

A user, such as a local mechanic 24, will connect the vehicle interface 32 with a vehicle. An example of a vehicle interface is a MONGOOSEPRO provided by Drew Technologies, Inc. of Ann Arbor, Mich. After the mechanic 24 performs a login at 69, the main menu is displayed at 70. The main menu provides the mechanic 24 with a series of features that can be launched in addition to various housekeeping functions at 71 and 72. Program 60 allows the mechanic to launch various tools at 73, such as investigating the status of various components of local system 28 at 74 or 75. Program 60 allows the local mechanic 24 to initiate either a diagnostic test routine 78 by initiating a health check function at 77 or a vehicle emission check 80 by initiating an emissions test function at 79. The functions initiated at 77 and 79 are communicated via Internet 42 to remote tech computer 36. Program 60 allows the local mechanic 24 to select at 76 a remote process program 92 used by remote technician 26 to begin a test sequence, as will be explained in more detail below, including with reference to FIG. 4. As noted, mechanic 24 may review various videos, articles or the like via a help routine at 72. Mechanic 24 may additionally review account information at 71. In addition, a new user, such as a mechanic 24 that is using the system for the first time, may be required to or directed to a user registration menu at 69A.

Figure 3:
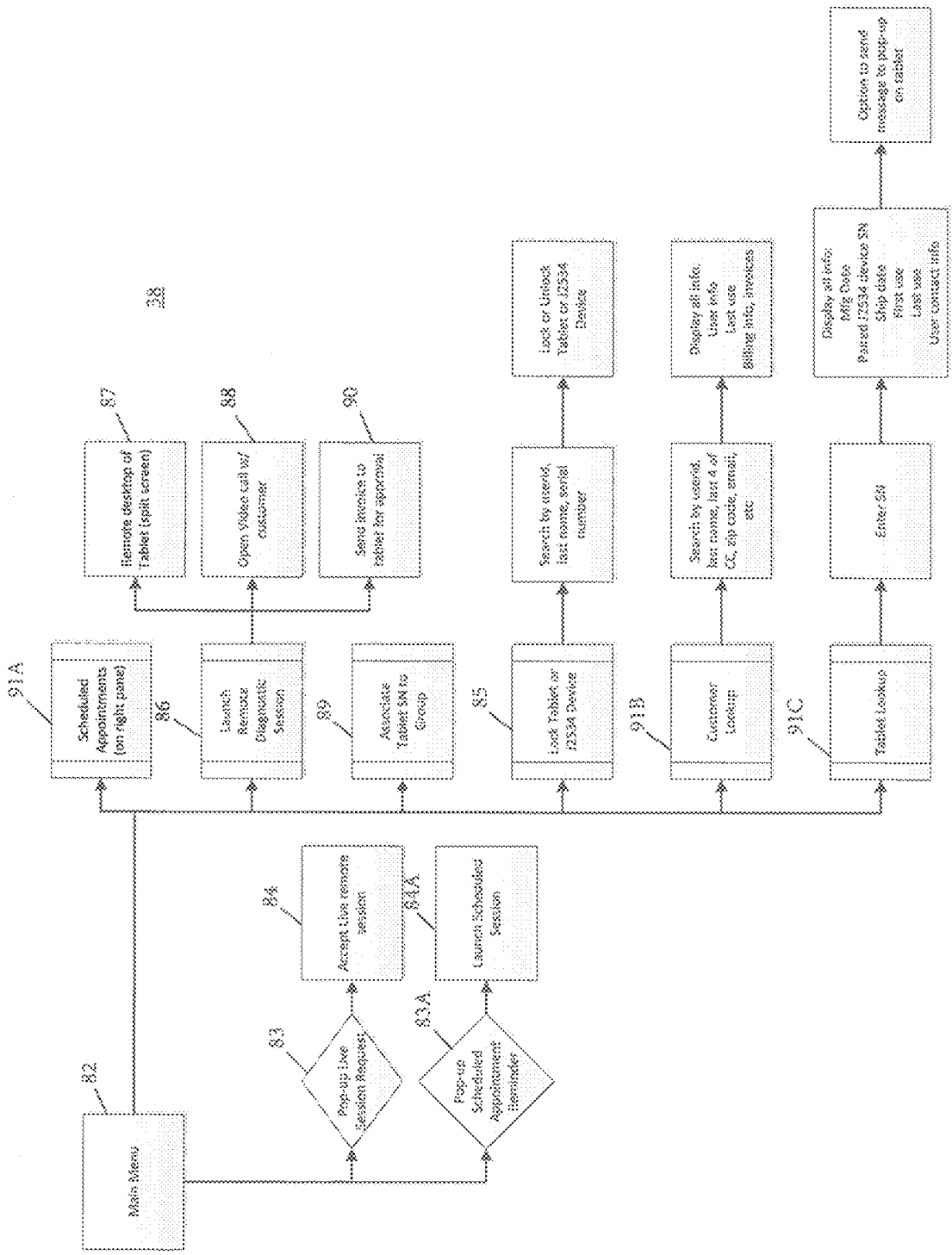
FIG. 3 is a process flow diagram of a software program provided for use by a remote system operator.

Referring now to FIG. 3 of the illustrated embodiment, remote diagnostic assistance software control program 38 begins at a main menu 82 that allows the remote technician 26 to accept at 84 a live session, such as via pop-up 83, requested by a local mechanic 24 at 76 of program 60. Alternatively, main menu 82 allows the remote technician 26 to initiate at 84A a pre-scheduled session, such as via pop-up 83A, that was previously arranged by a local mechanic 24.

From main menu 82 of program 38, the technician 26 can perform various administrative functions including locking or unlocking at 85 vehicle interface 32 or remote computer 60 to allow control over these devices, such as due to non-payment or other reason. From main menu 82, the technician 26 may also schedule appointments at 91A, such as may be requested by a mechanic 24. Technician 26 may also perform queries or research via program 38, such as looking up information regarding customers at 91B, and/or search for information regarding a particular local computer system 34 at 91C, including with the ability to send messages to a particular local computer 34.

Still further, from main menu 82 the remote technician 26 can launch a diagnostic health check 78 (FIG. 2) and/or an emission test 80 (FIG. 2) by launching a remote diagnostic session at 86. The launching of remote diagnostic session at 86 allows the operator to open a split-screen session on computer 28 at 87, opening a video call with the mechanic at 88 and or sending an invoice at 90 to computer 28 for the testing that is being requested. A selection 89 is provided that allows the remote technician 26 to assign the local system to one of two (or more) groups. In one group, the local mechanic 24 is allowed to view (but not alter) progress of the vehicle testing being carried out by the remote technician 26. In another group, the mechanic 24 is not allowed to view progress of the test being performed.

Figure 4:
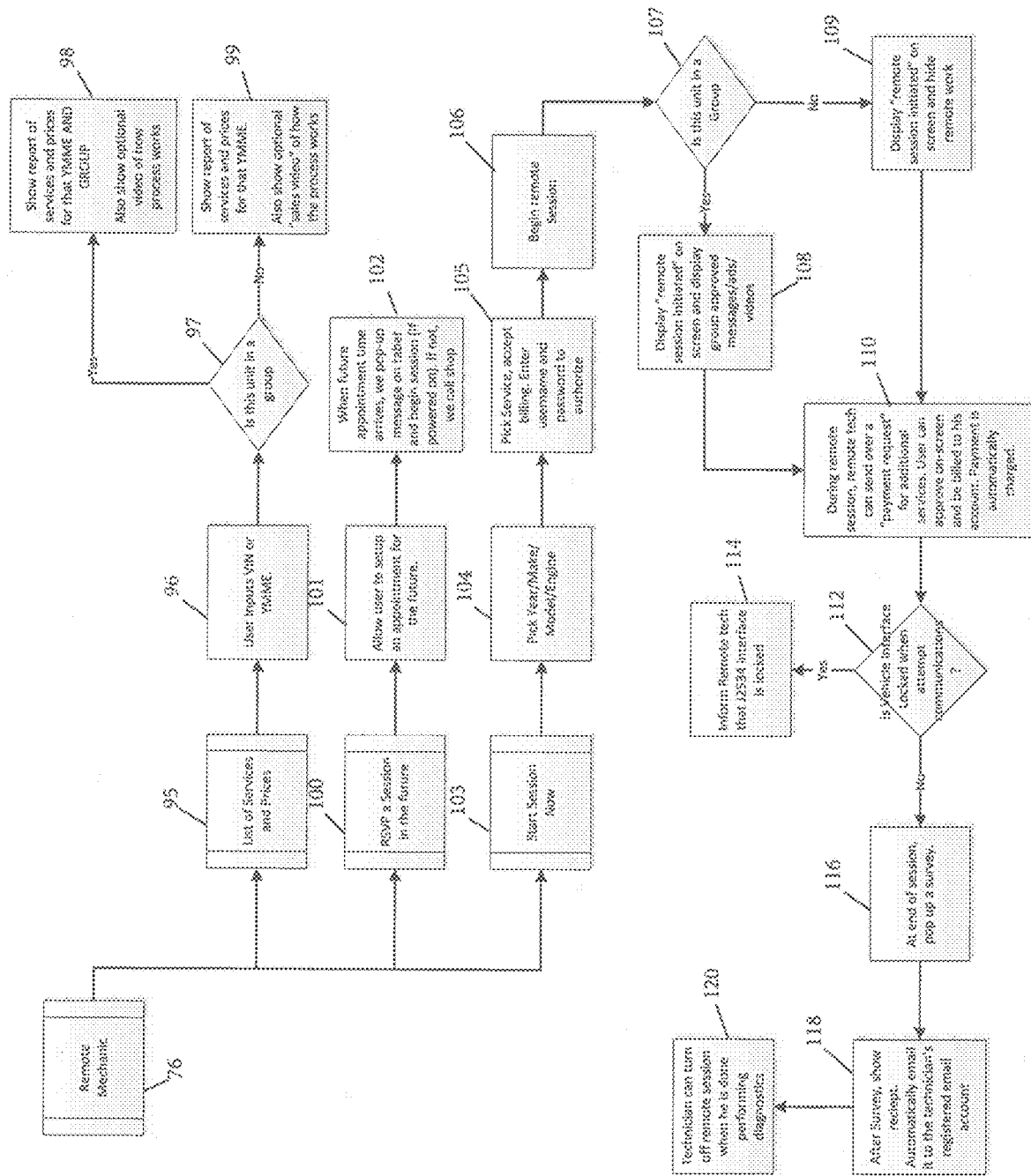
FIG. 4 is a process flow diagram of a remote diagnostic session program.

As noted, a remote testing program 92, shown in FIG. 4, is then launched at 76 (FIG. 2) by remote technician 26. Program 92 allows the technician 26 to list services and prices for the local mechanic at 95 upon the local mechanic inputting the vehicle identification number (VIN) or year, make, model, and engine type (YMME) of the vehicle under test at 96. Program 92 determines if the local mechanic is a member of the group that is allowed to view tests in progress. If so, in addition to a report of services and prices for that YMME shown at 98, the mechanic is shown a video on the tests that will be performed which he/she will be allowed to witness. If the local mechanic is not part of a group that is allowed to monitor tests as they are performed, only services and prices for that YMME are shown at 99. Program 92 allows a future session to be scheduled (100, 101) in the future and carried out at 102 at the special date.

If the remote technician 26 is ready to begin a remote diagnostic session, a start session selection is made at 103 (FIG. 4). The technician 26 enters the YMME of that vehicle to be tested at 104 and selects the services to be performed and enters the information needed to authorize the charge to the customer's credit card at 105. The remote session is selected to begin at 106 and a determination is made at 107 whether the local mechanic is a member of the group that is allowed to view the tests as they are performed. If so, program 92 displays the remote services being performed at 108. If not, then only "remote session initiated" is displayed, or some other message or notice, and the rest of the remote session is blocked from that local mechanic at 109. During the remote session, the remote technician 26 can communicate payment requests for additional services recommended at 110 and can approve payment of the charges for those additional services.

With further reference to FIG. 4, a determination is made at 112 if vehicle interface 32 has been locked. If so, the remote technician 26 is so informed at 114. If the vehicle interface 32 is not locked, the remote technician 26 performs the tests paid for. A user survey is displayed at 116 on the local computer 34 and sent to the remote technician 26 at 118. After that, the remote session is terminated at 120.

Figure 5:
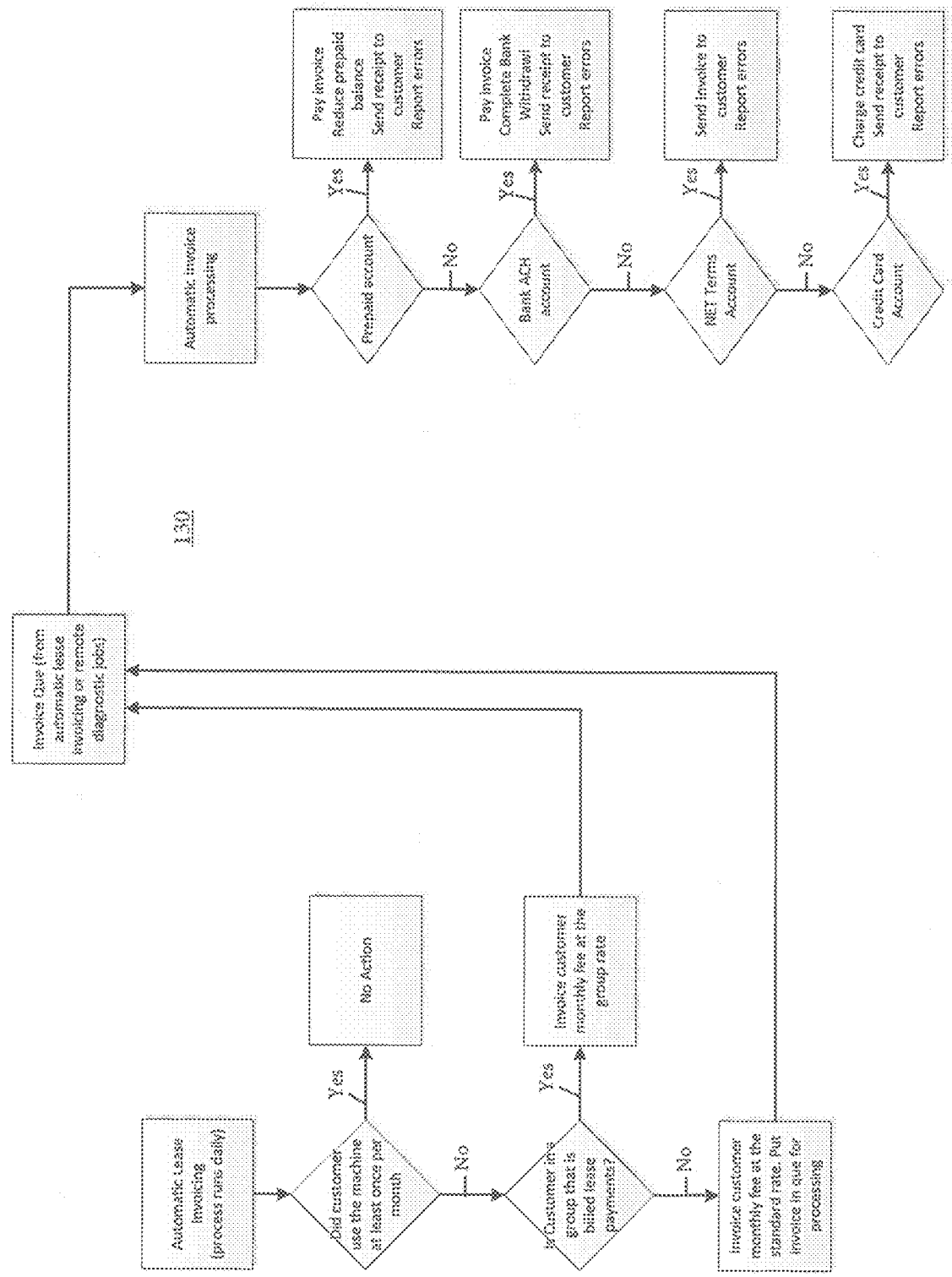
FIG. 5 is a process flow diagram of a server software program running on the remote system.

As illustrated in FIG. 5, vehicle diagnostic system 20 may further comprise, or be used in association with a software program 130 that is provided for operation of the overall server, where program 130 provides control of lease payments for the diagnostic computer 34 that is leased to each local mechanic 24. As shown in the flowchart of FIG. 5, different determinations are made with regard to each local customer mechanic 24, including their actual use of the vehicle diagnostic system 20, and the particular billing information and arrangements for the mechanic 24.

Figure 6:
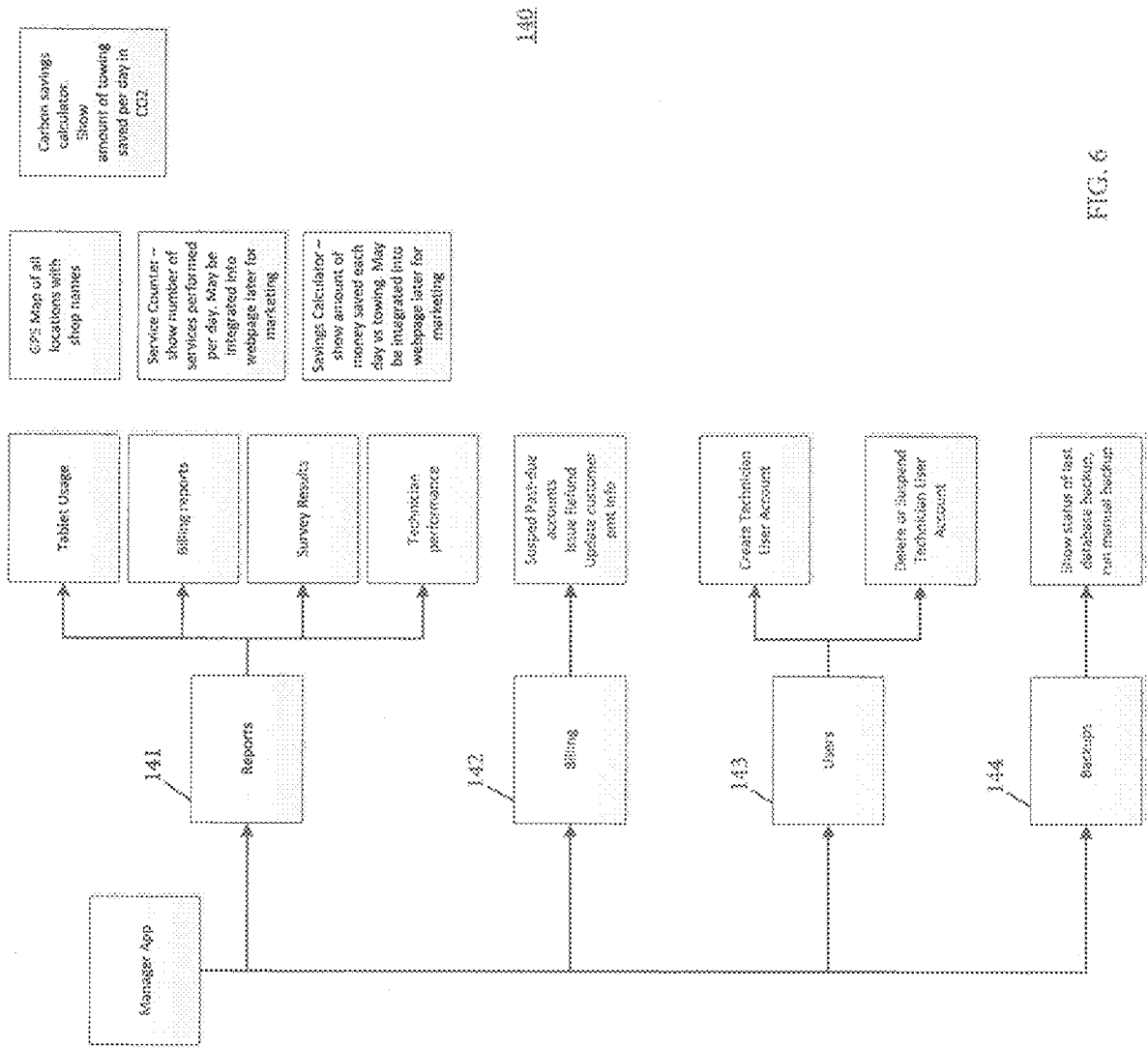
FIG. 6 is a process flow diagram of a manager software program running on the remote system.

Referring now to FIG. 6, vehicle diagnostic system 20 may further comprise, or be used in association with a manager software program 140 that is provided for management of overall operation of system 20. Manager software program 140 is capable of providing reports, such as at 141, and including:
  a. Where each system is geographically located by using the GPS information from the tablet.
  b. Which systems are in use and which systems have not been used for a long period of time.
  c. Results of survey information collected from the remote mechanic on-screen.
  d. Average repair time per job based on VIN-decoded year, make, and model.
  e. A savings report showing how much each local mechanic saved using the remote diagnostic service versus having to outsource the job to a different shop.
  f. All past-due accounts.
  g. All stolen systems and their last GPS location when powered on.

Manager software program 140 additionally allows review of and action to be taken with regard to billing issues at 142, such as suspending accounts for customers that are in arrears, issuing refunds, and updating customer payment information. Program 140 additionally enables, such as at 143, accounts for new technicians 26 to be created, or to delete or suspend the account of a technician 26. For example, the owner or operator of system 20 may enable third party technicians 26 to utilize system 20. As also illustrated, program 140 additionally enables system backups to be performed and reviewed.

Figure 7:
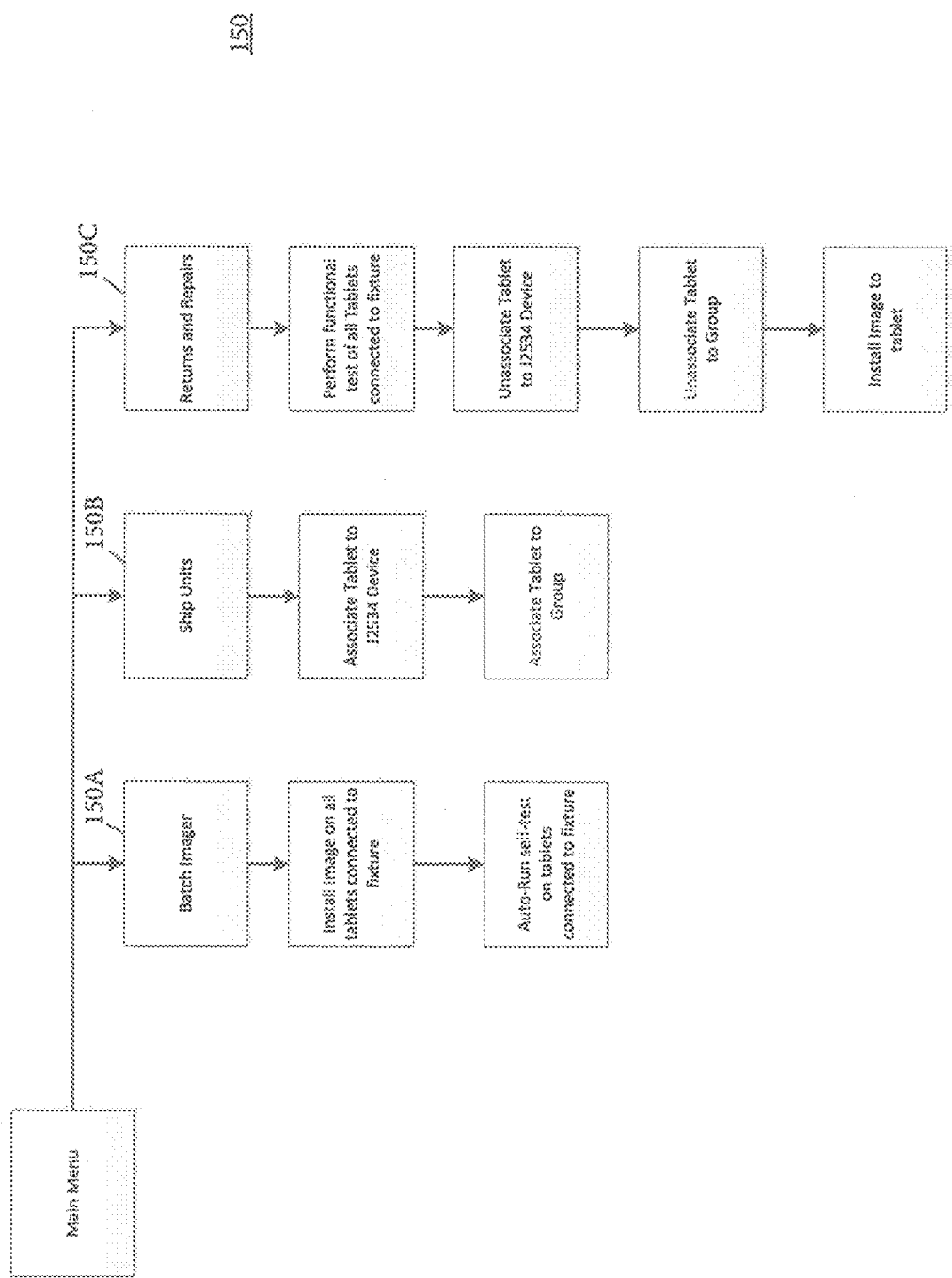
FIG. 7 is a process flow diagram of software used in the production of a local computer system.

Referring now to FIG. 7, vehicle diagnostic system 20 may further comprise, or be used in association with a manufacturing software program 150 that is provided to control overall production and supply of local computer system tablets 34 to the local mechanics. Software program 150 may be operated in connection with a fixture for loading and testing programs on local computer systems 34. The fixture may comprise, for example, a USB or Ethernet connection, or other hardware, integrated or connected with a computer running program 150 to push data to one or more computers 34, such as when the computers 34 are at the facility of the owner/operator of system 20. As understood from the illustrated embodiment of FIG. 7, program 150 enables images to be installed on systems 34, and performance of self-tests on systems 34 (150B). Program 150 is further used in connection with the shipping and tracking of local computer systems 34, such as associating systems 34 with a particular group, such as a particular entity that utilizes multiple systems 34, including in disparate locations (150B). Program 150 may be further used for tracking and repairing returned systems 34, including resetting systems 34 for use with another customer (150C).

Figure 8:
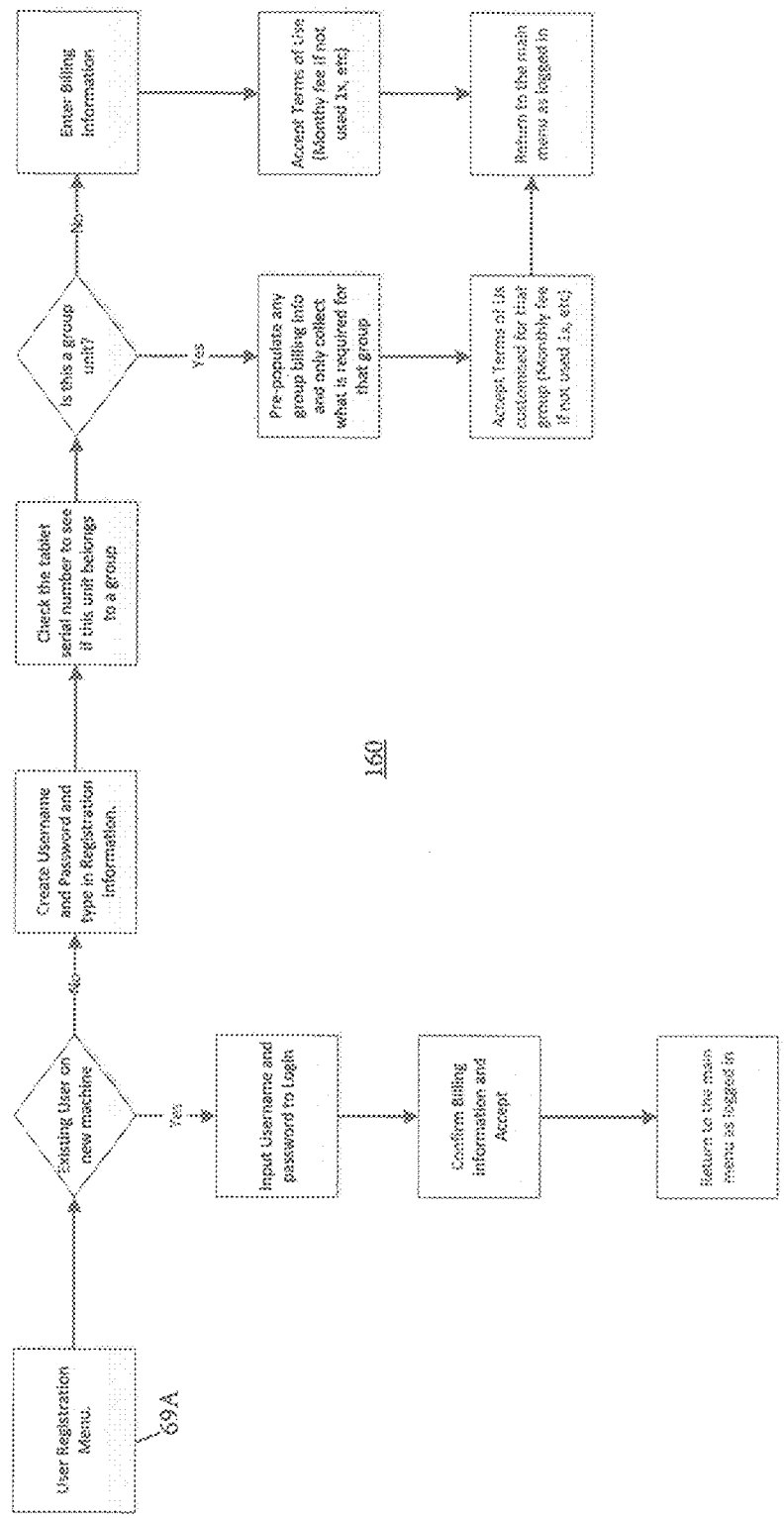
FIG. 8 is a process flow diagram of software used to register users.

Referring now to FIG. 8, vehicle diagnostic system 20 may further comprise, or be used in association with a user registration software program 160 that provides a process for registering local mechanics and maintaining current information regarding that mechanic including username and password for access to the system. The user registration program 160 may be accessed at 69A of the program 60, discussed above.

Thus, it can be seen that the present invention is embodied in a remote diagnostic system including a hardware kit that is leased or rented to the local mechanic and shipped pre-configured, special remote software, and a service where a remote technician performs all diagnostic functions. A computer or tablet is provided with a commercial-operating system onsite with the local mechanic that completely allows the remote technician access to perform diagnostics and programming, but the local mechanic is not given access to control or interfere with the diagnostic software or process (except for perhaps unplugging the system). The local mechanic also cannot monitor or see what is transpiring on screen unless the local mechanic is placed in a group that allows for such monitoring. In such group, the local mechanic is not given access or control to interfere with the diagnostics process, but has the ability to monitor or see the process as it is occurring. This application could even pop up labels or descriptions as to the in-progress steps as they happen. This might help the local mechanic to understand what is involved in the process.

The local computer system may be rented or leased to the local mechanic at a low cost. The local mechanic does not need to purchase a system. The mechanic can simply lease it until they are done using it. The revenue can be collected by charging per-incident fees instead of requiring an upfront tool purchase or high lease payment. The local computer system may include an installed Internet connection that is pre-configured (such as 3G/4G) so the local mechanic does not have to install their own Internet connection or configure it to connect to a hot spot. Upon power up, the local system will automatically connect to the Internet. Because the local mechanic is leased the computer, the local mechanic does not need to obtain a license to use the local software included in diagnostic system 20. The local mechanic is supplied the licensed programmed machine. There are no further obligations in addition to making lease payments and per-use fees.

Since the pre-configured system is setup and ready to go, there is no risk of use of out-of-date or unlicensed (pirated) diagnostic software. Local computer system 34 will be kept properly licensed, configured, and up to date. The diagnostic system 20 can be tightly monitored and controlled with the system properly maintained and all automatic updates provided. Whenever a determination is made that there is a software update that is required for any diagnostic application, operating system, or hardware driver, the update can be "pushed" to all customers in an efficient and controlled way that does not require the local mechanic to interact. Updates that might negatively affect proper functioning of the computer or the diagnostic applications will be withheld.

Diagnostic system 20 may include built-in billing methods used by the local technician. When a remote diagnostic service is performed, it can automatically be charged to the credit card of the vehicle owner or local mechanic and the invoice automatically generated. A scheduler function may be provided in which the local mechanic can setup an appointment for the remote diagnostics service based on the next available slot or for a future time when he expects the vehicle to be ready for testing.

An emissions compliance test may be performed by diagnostic system 20 and carried out by the remote technician in the manner previously set forth with respect to diagnostic tests. An OBD health check may be incorporated into this diagnostic system 20 where this test is conducted by a remote technician and the status of all modules in the vehicle are printed on a health report for the customer or local mechanic. A locking feature may be provided in which components of the vehicle diagnostics system can be remotely locked in the event that the local mechanic's account becomes delinquent or the components are stolen. An insurance feature may be provided in order to have insurance cover any expense if the diagnostics or programming procedures are unsuccessful. This insurance would cover all costs to repair the vehicle, including towing, parts, and third party service fees.

Figure 9:
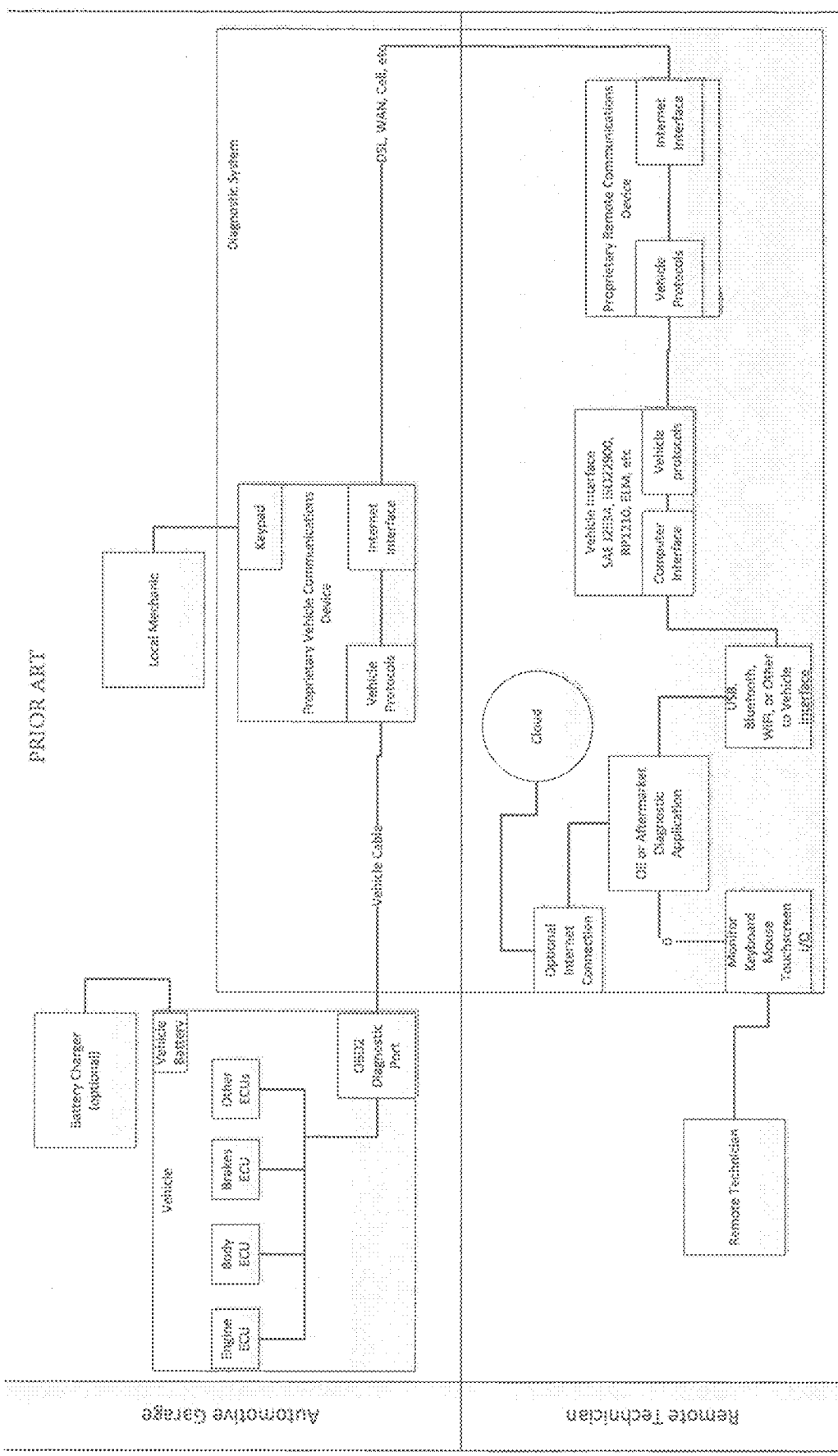
FIG. 9 is a block diagram of a remote diagnostic system according to the prior art.

Thus, it can be seen that the present invention is embodied in a diagnostic system and method that is superior to previously proposed techniques. For example, a prior art system is shown in FIG. 9 that allows a remote technician to diagnose a vehicle by having the local mechanic plug in an adapter that converts the vehicle's protocol data into Internet packets which are transported to a remote location where they are converted back into vehicle protocol data. This system is to allow a remote technician to use any diagnostic tool remotely while placing minimal hardware where the car is located. This system has several disadvantages. The Internet may not be fast enough to support communication timing requirements between a vehicle and remote diagnostic tester, so Internet performance can impact system capabilities. Loss or delay of data can cause a diagnostic failure resulting in compromised safety of the local technician, potential damage to the vehicle, and unrecoverable damage to a programmable module if a reprogramming operation does not complete successfully. The translation of vehicle protocol data to Internet packets is a complex process and must account for variation in how vehicle protocols are implemented from one model or year to the next. Some older vehicles cannot be supported because they cannot accept the latency the Internet would introduce into the system.

Figure 10:
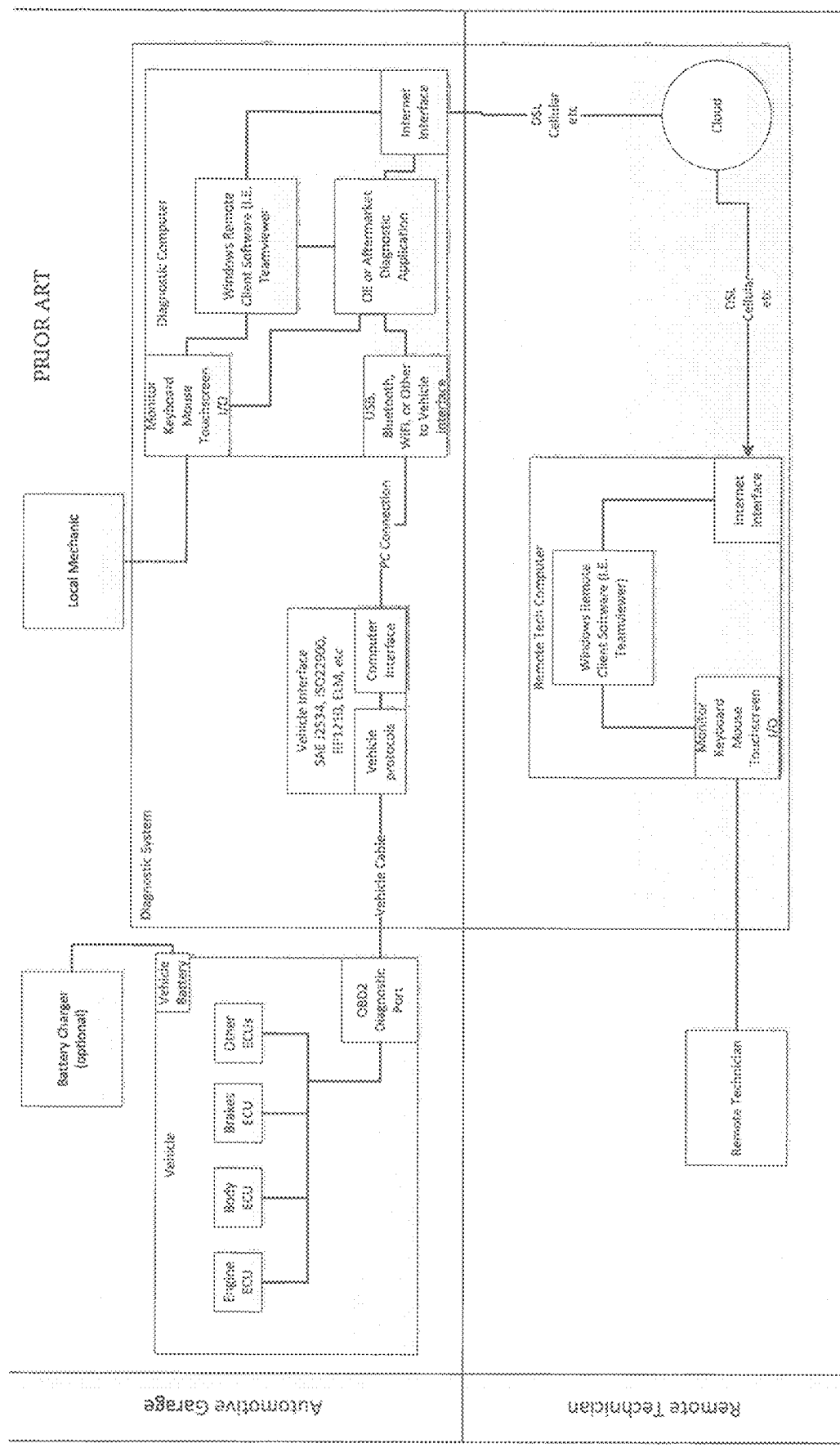
FIG. 10 is a block diagram of another remote diagnostic system according to the prior art.

Another prior art system is shown in FIG. 10 in which an Internet connection and a remote desktop client application are utilized to connect a remote technician to a local mechanic's diagnostic system. Control of the mouse pointer on a diagnostic application may occur from a remote location to assist in the diagnostics and repair of the vehicle. However, this system still allows the local mechanic to touch and interact with the diagnostics software. A remote technician and local mechanic share control at the same time, so it is difficult to determine who is responsible for operating the software. There is considerable time and effort involved in installing the diagnostic applications on the local mechanic's computer and configuring them correctly. Even if the local mechanic is supplied a pre-configured computer system, the local mechanic must still obtain the appropriate licenses for the diagnostic applications. The process for obtaining the licenses can be cumbersome and time-consuming, increasing the cost to use the system.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A vehicle diagnostic system, comprising:
  a local system adapted to connect with a vehicle, said local system having a vehicle interface and a local computer system operatively connected with said vehicle interface, said local computer system including and operating a diagnostic program specific to the vehicle under test and an Internet interface; and
  a remote system adapted to connect with said local system via an Internet, said remote system having a remote diagnostic control program, said remote diagnostic control program interfacing with said local computer system for performing a diagnostic evaluation of a vehicle under test by operation of said diagnostic program;
  wherein said remote system controls the local system to perform the diagnostic evaluation of the vehicle under test via said diagnostic program and exclusive of a local operator of said local system, and wherein the local operator of said local system has no control over said diagnostic program.

2. The vehicle diagnostic system as claimed in claim 1 wherein said vehicle interface has a unique identification and wherein said local computer system is associated with a particular vehicle interface according to the identification of that vehicle interface.

3. The vehicle diagnostic system as claimed in claim 1 wherein said local computer system is a portable computer that is owned by an owner of said remote system.

4. The vehicle diagnostic system as claimed in claim 3 wherein said remote system is configured to selectively enable and disable said local computer system.

5. The vehicle diagnostic system as claimed in claim 4 wherein the owner of said remote system provides all maintenance on said local computer and said vehicle interface.

6. The vehicle diagnostic system as claimed in claim 3 wherein said portable computer has a built-in Internet connection.

7. The vehicle diagnostic system as claimed in claim 1 wherein said local computer system has a display and wherein said remote diagnostic control program does not allow the local operator of said local system to view progress of a diagnostic evaluation being performed with said local system.

8. The vehicle diagnostic system as claimed in claim 1 wherein said local computer system has a display and wherein said remote diagnostic control program allows the local operator to view progress of a diagnostic evaluation being performed with said local system.

9. The vehicle diagnostic system as claimed in claim 1 wherein said remote diagnostic system pushes updates to said local computer system.

10. The vehicle diagnostic system as claimed in claim 1 wherein said diagnostic program is adapted to perform at least one chosen from (i) a check of the status of all electronic modules of the vehicle and (ii) an emissions certification test of the vehicle.

11. The vehicle diagnostic system as claimed in claim 1 wherein said remote system is configured to receive data from said diagnostic evaluation by said local system, and wherein said remote system includes a database of indicators for common vehicle failure modes for a plurality of types of vehicles, and wherein said remote system is configured to perform an analysis of said data via said database for diagnosing failure conditions in a particular type of vehicle to provide failure statistics to vehicle manufacturers and regulators.

12. A method of performing vehicle diagnostics, comprising:
connecting a local system with a vehicle using a local system operator, said local system having a vehicle interface and a local computer system operatively connected with said vehicle interface, said local computer system including a diagnostic program specific to the vehicle under test and having an Internet interface; and
connecting a remote system with said local system via an Internet, said remote system having a remote diagnostic control program, said remote diagnostic control program interfacing with said local computer system;
performing a diagnostic evaluation of the vehicle under test with said diagnostic program by operating said remote system to control said local system;
wherein a remote operator operating said remote system controls said local system to perform the diagnostic evaluation of the vehicle under test exclusive of a local operator of said local system, and wherein the local operator of said local system has no control over said diagnostic program.

13. The method as claimed in claim 12 wherein said vehicle interface has a unique identification and wherein said local computer system is associated with a particular vehicle interface according to the identification of that vehicle interface.

14. The method as claimed in claim 12 wherein said local computer system is a portable computer that is owned by an owner of said remote system and wherein the owner of said remote system supplies said local computer system to the local system operator of said local system.

15. The method as claimed in claim 14 wherein further comprising selectively enabling and disabling said local computer system with said remote system.

16. The method as claimed in claim 14 wherein the owner of said remote system provides all maintenance on said local computer and said vehicle interface.

17. The method as claimed in claim 14 wherein said portable computer has a built-in Internet connection.

18. The method as claimed in claim 12 wherein said local computer system has a display and wherein said remote diagnostic control program does not allow the local operator to view progress of the diagnostic evaluation being performed with said local system.

19. The method as claimed in claim 12 wherein the local computer system has a display and wherein said remote diagnostic control program allows the local operator to view progress of the diagnostic evaluation being performed with said local system.

20. The method as claimed in claim 12 wherein said remote diagnostic system pushes updates to said local computer system.

21. The method as claimed in claim 12 wherein said diagnostic program is adapted to perform at least one chosen from (i) a check of the status of all electronic modules of the vehicle and (ii) an emissions certification test of the vehicle.

22. The method as claimed in claim 12 wherein said remote system includes a database of indicators for common vehicle failure modes for a plurality of types of vehicles, and wherein said method further comprises receiving data from said diagnostic evaluation by said local system and performing an analysis of said data via said database for diagnosing failure conditions in a particular type of vehicle, and providing failure statistics to vehicle manufacturers and regulators.

* * * * *